United States Patent [19]
Farrand

[11] 3,732,513
[45] May 8, 1973

[54] POSITION-MEASURING TRANSFORMER AND SCALE MEMBER

[75] Inventor: Clair L. Farrand, Bronxville, N.Y.

[73] Assignee: Inductosyn Corporation, Valhalla, N.Y.

[22] Filed: Oct. 14, 1971

[21] Appl. No.: 189,282

[52] U.S. Cl. ............................... 336/129, 336/200
[51] Int. Cl. .......................................... H01f 21/04
[58] Field of Search ................ 336/115, 122, 123, 336/129, 200, 30

[56] References Cited

UNITED STATES PATENTS

| | | | |
|---|---|---|---|
| 3,181,095 | 4/1965 | Farrand et al. | 336/30 |
| 3,202,948 | 8/1965 | Farrand | 336/123 XR |
| 2,915,721 | 12/1959 | Farrand et al. | 336/123 XR |
| 3,522,568 | 8/1970 | Hasbrouck | 336/200 XR |
| 3,441,888 | 4/1969 | Farrand | 336/123 |
| 2,799,835 | 7/1957 | Tripp et al. | 336/123 |

FOREIGN PATENTS OR APPLICATIONS

| | | | |
|---|---|---|---|
| 1,247,298 | 10/1960 | France | 336/123 |

*Primary Examiner*—Thomas J. Kozma
*Attorney*—William E. Beatty

[57] ABSTRACT

Disclosed is an improved scale winding member which is one member of a two-member position-measuring transformer. The two members are relatively movable with respect to each other in the direction of measurement. The scale winding member is formed from a plurality of individual units, frequently called bar scales or scale units. Each scale unit includes a winding section supported on a separate base. A plurality of the scale units are positioned end to end with the winding sections from each electrically interconnected to form the continuous scale winding. Each winding section includes active conductors, having a fine pitch, transverse to the direction of relative movement. The active conductors are connected in series by end conductors where the end conductors extend parallel to the direction of relative movement. Return conductors are positioned opposite and parallel to the end conductors to neutralize unwanted fields. The individual winding section on one scale unit is electrically connected to the individual winding section of an adjacent scale unit by pairs of interconnecting conductors. Each conductor in each pair is substantially identically arrayed in space to mate with the other conductor in the pair and each conductor conducts with a current equal to but in the opposite direction of the current in the other conductor of the pair to neutralize unwanted coupling. The pairs of conductors are formed with one conductor from one scale unit and the other conductor from the abutting scale unit. The interconnecting conductors from return conductors on each unit are paired together as are interconnecting conductors from end conductors so that all paired conductors carry equal current.

5 Claims, 14 Drawing Figures

INVENTOR.
CLAIR L. FARRAND
BY W E Beatty
David G. Lovejoy
ATTORNEYS

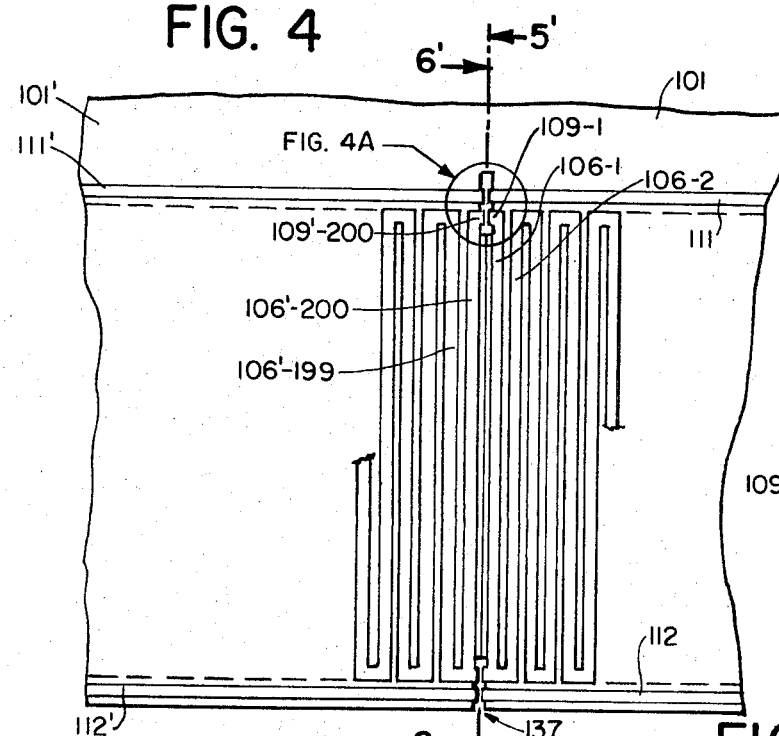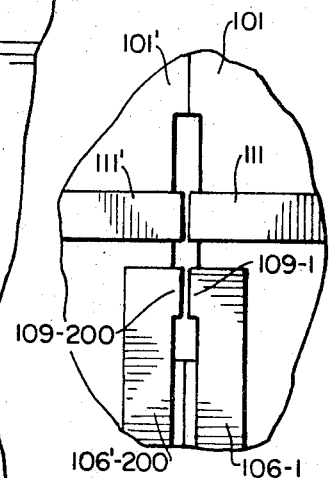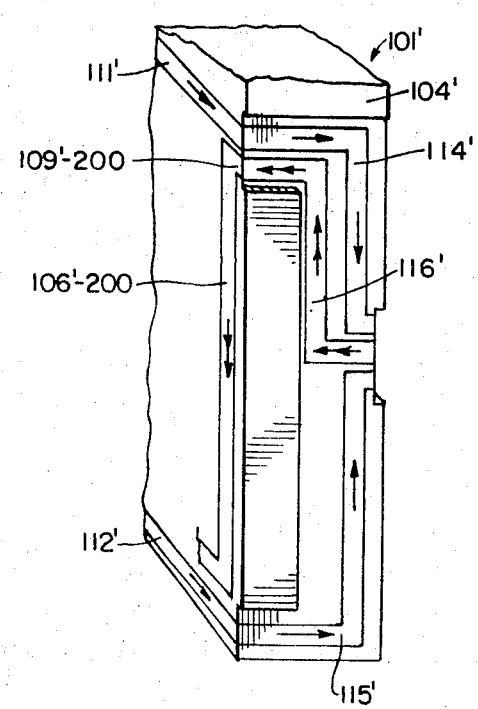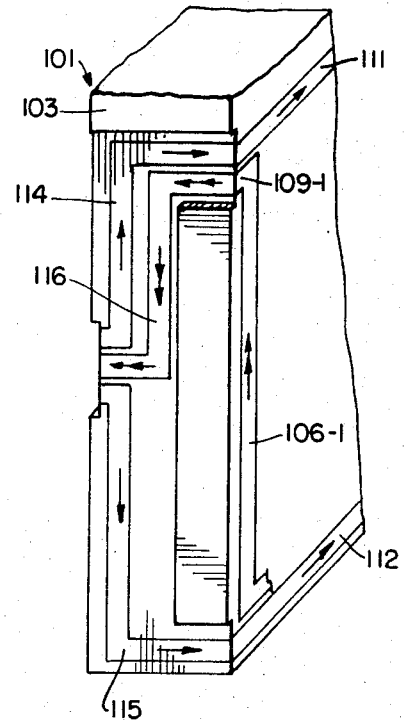

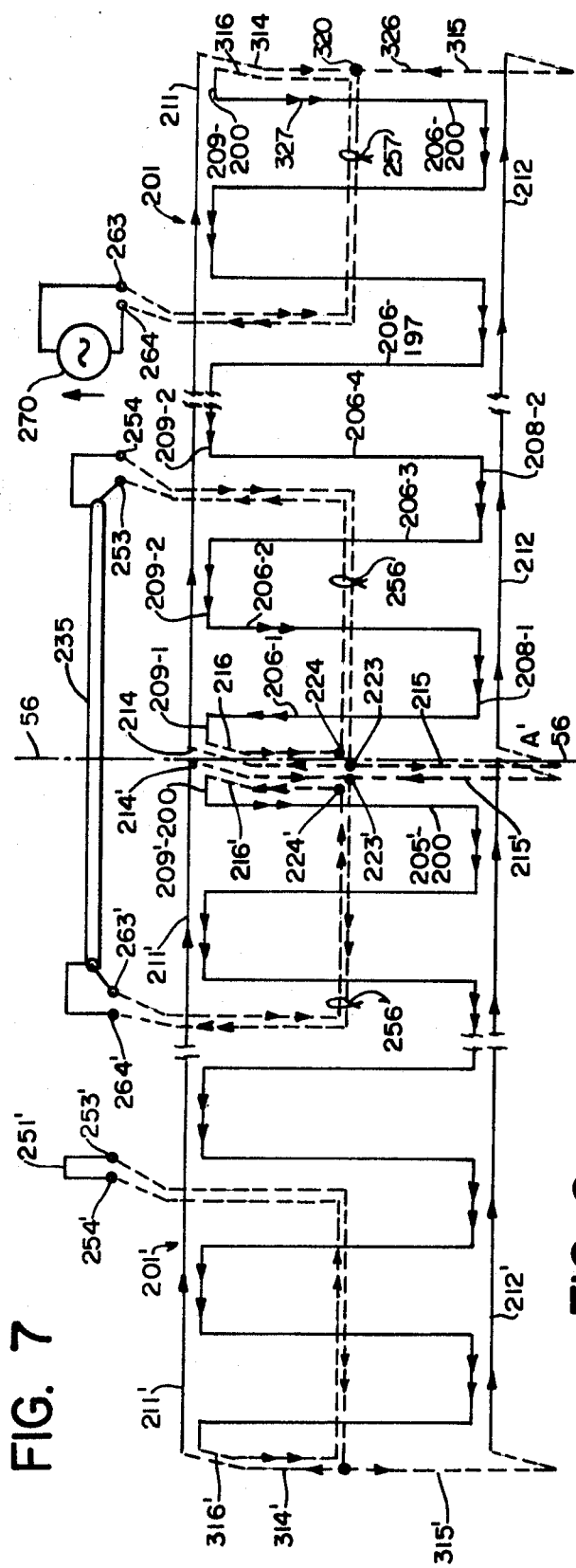

INVENTOR.
CLAIR L. FARRAND

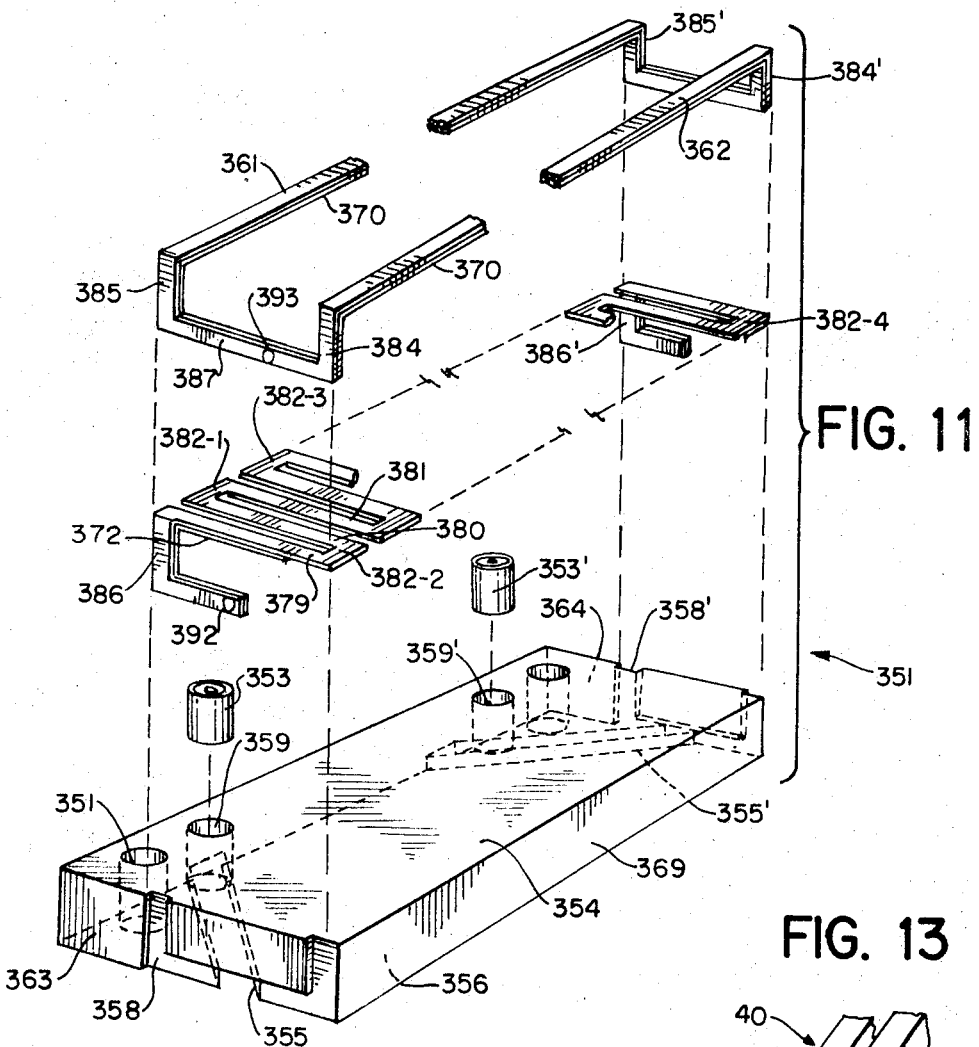
FIG. 11
FIG. 13
FIG. 12
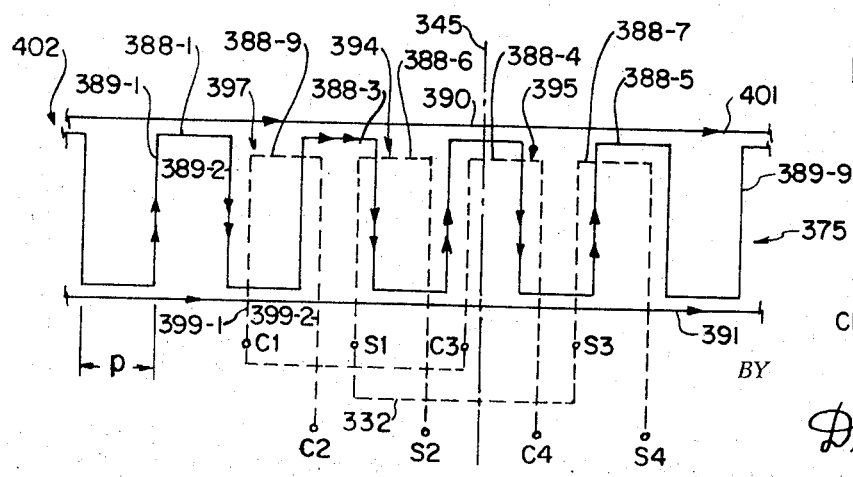
INVENTOR.
CLAIR L. FARRAND

POSITION-MEASURING TRANSFORMER AND SCALE MEMBER

BACKGROUND OF THE INVENTION

This invention relates to members for position-measuring transducers and particularly to the scale member of a two-member position-measuring transformer.

One prior art technique for cancelling or neutralizing unwanted field coupling of the scale member relative to the other member of a position-measuring transformer is described in U.S. Pat. No. 2,915,721 to C. L. Farrand, et al. and assigned to the same assignee as the present invention. In that patent, the parallel active conductors on each individual scale unit have a relatively fine pitch transverse to the direction of relative movement of the transformer members. The fine pitch active conductors on each scale unit are serially connected by end conductors parallel to the direction of member relative movement. The end conductors are located at opposite ends of the active conductors and are accordingly given the name end conductors. The end conductors are intended not to interfere with the fine coupling between the active conductors of the transformer members and hence the end conductors have also been referred to as inactive conductors. The end conductors, while intended to be inactive, all conduct in the same direction giving rise to a potential for unwanted coupling to the other member of the position-measuring transformer. In order to neutralize the unwanted coupling of the end conductors, the U.S. Pat. No. 2,915,721 employs return conductors arrayed opposite and parallel to the end conductors where the return conductors conduct current in the opposite direction of the end conductors.

The return conductors divide the current in the active conductors and their connecting end conductors so that the return conductors carry one-half the current of the end conductors. The effect of the return conductors is to neutralize the unwanted fields that would be otherwise coupled by the end conductors.

While the use of return conductors on individual scale units is effective in reducing the unwanted coupling, the problem of interconnecting the winding section from one individual scale unit across the junction between scale units to the winding section of an adjacent scale unit, without producing unwanted coupling, has not heretofore been satisfactorily solved. Soldered wire or ribbon connections across the junction have been found unacceptable in that the soldering cannot be readily and conveniently performed while maintaining the positional accuracy which is required.

In those instances where no junctions are present, such as in the tape scales described in U.S. Pat. No. 3,522,568 to H. A. Hasbrouck and assigned to the same assignee as the present invention, the half-current return conductors have been employed with excellent results. Because those tape scales do not have junctions between scale units, they do not present the problem solved by the present invention.

In accordance with the above background, it is an object of the present invention to overcome the problem of neutralizing unwanted fields which arise from the interconnecting conductors employed to interconnect the winding sections of adjacently placed end-to-end scale units.

SUMMARY OF THE INVENTION

The present invention is an improved scale unit and position-measuring transformer. A plurality of the scale units are positioned end to end and are electrically interconnected to form the continuous winding member which is the reference for the other member of the position-measuring transformer.

The scale units of the present invention include interconnecting conductors for interconnecting adjacent scale units placed end to end. The interconnecting conductors are paired so that each conductor of the pair conducts with equal current in the opposite direction of the other conductor of the pair. Each conductor of the pair is substantially identically arrayed opposite the other conductor of the pair when the scale units are positioned in end-to-end relationship. The opposing currents in the interconnecting conductors together with the identical spatial array of each conductor in the pair results in the cancellation of the undesired field coupling which would otherwise result from the interconnecting conductors.

The improved scale units each include active conductors arrayed, with a fine pitch, transverse to the direction of measurement. Connecting conductors, frequently called end conductors, electrically connect adjacent active conductors in series in a manner such that adjacent active conductors conduct in opposite space directions. In the proximity of the end conductors, return conductors are employed to neutralize the unwanted fields created by the end conductors. The resultant field patterns of the active conductors, the end conductors, the return conductors, and the interconnecting conductors is a fine pattern which when coupled by the other member of the position-measuring transformer results in the desired fine pattern measuring field substantially uninterrupted by unwanted fields.

The return conductors and the end conductors of the present invention are spatially arrayed in or parallel to the plane of the active conductors. The interconnecting conductors are arrayed out of the plane of the active conductors on the abutting ends of each bar scale. The spatial pattern on one abutting end of each scale unit is identical to the spatial pattern on the abutting end of an adjacent scale unit. Further, the conduction direction of the interconnecting conductors on one abutting end relative to the conduction direction on the other abutting end is opposite. The identity of the spatial array pattern and the opposite conduction direction insure that the unwanted fields are cancelled.

BRIEF DESCRIPTION OF THE DRAWINGS

FIG. 4 depicts a top view of the abutting end portions of two scale units of the FIG. 1 type at approximately twice full size. FIG. 4A shows the junction top area enlarged.

FIG. 5 depicts a perspective view of the end portion of the left-hand scale unit of FIG. 4 taken along the junction line 5—5 between the two scale units.

FIG. 6 depicts a perspective view of the end portion of the right-hand scale unit of FIG. 4 taken along the junction line 6—6, which is colinear with the junction line 5—5.

FIG. 7 depicts an electrical and spatial schematic representation of two scale units, of the FIG. 1 or FIG. 9 type, abutted end to end and electrically interconnected.

FIG. 8 depicts a schematic representation of the resultant field pattern presented by the two electrically connected and abutting scale units represented in FIG. 7.

FIG. 11 depicts an exploded assembly view of the scale unit of FIG. 9.

FIG. 12 depicts an electrical and spatial schematic view of the windings from both members of a position-measuring transformer.

FIG. 13 depicts a perspective view of a portion of a position-measuring transformer.

DETAILED DESCRIPTION

Figure 1:
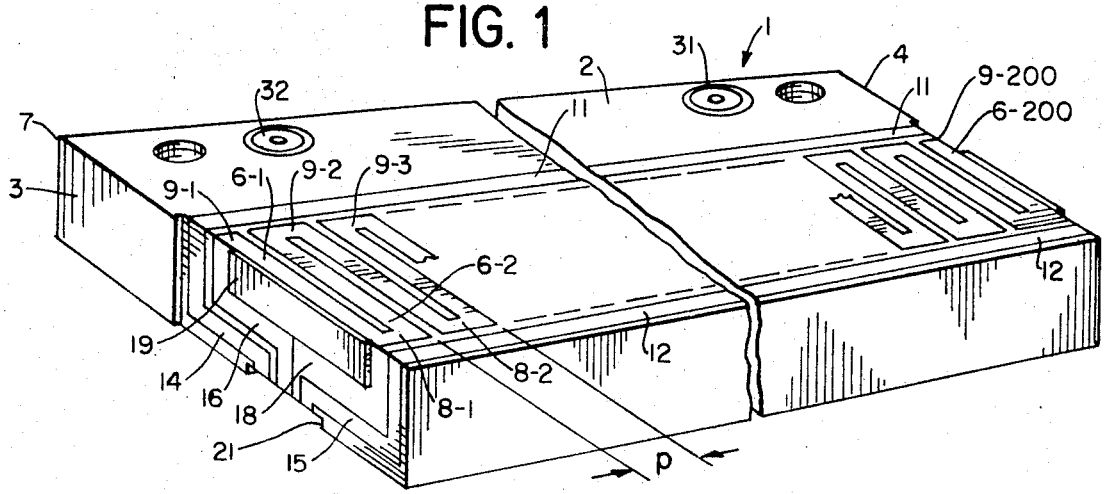
FIG. 1 depicts a top perspective view of a single scale unit in accordance with the present invention.

In FIG. 1, an individual scale unit 1 is depicted. A plurality of scale units like scale unit 1 of FIG. 1 are positioned end to end, in the manner shown in FIG. 3, to form the continuous scale member of a position-measuring transformer. Those end-to-end scale units are electrically interconnected so that a continuous winding is formed from the individual winding sections on each scale unit.

In FIG. 1, the winding section includes the active conductors identified with the prefix 6- such as 6-1, 6-2, 6-3 and so on up to 6-200. The active conductors 6-1 through 6-200 have a constant spacing or pitch, $p$, and define the reference cycle with respect to the other member (not shown in FIG. 1) of the position-measuring transformer. The active conductors extend in a direction transverse to the direction of measurement and also transverse to the direction of relative movement of the transformer members. The active conductors 6- lie on the surface 2 of base 7 of the scale unit 1 where surface 2 defines a base plane. Scale unit 1 has ends 3 and 4 which are normal to the base plane, that is, normal to surface 2 of base 7.

The active conductors 6- are interconnected electrically in series by the end conductors identified with the prefixes 8- and 9-, as for example, 8-1, 9-1, 8-2, 9-2. The end conductors with prefix 8- appear along one end of the active conductors 6- and the end conductors with prefix 9- appear at the opposite end of the active conductors 6-. The end conductors 8- and 9- all conduct in one direction generally normal to the direction of conduction of the active conductors 6-.

A return conductor 11 is, in FIG. 1, positioned parallel to and opposite the end conductors 9-1 through 9-200, and similarly, a return conductor 12 is parallel to and opposite the end conductors 8-. Both return conductors 11 and 12 are on surface 2 and are therefore parallel to the base plane defined by surface 2. As will be explained hereinafter, the return conductors 11 and 12 are wired to conduct in the opposite direction of the end conductors 9- and 8-. The active conductor 6-1 and the end conductor 9-1 are connected to the interconnecting conductor 16 on the end 3 of scale unit 1. Similarly, the return conductors 11 and 12 are connected to interconnecting conductors 14 and 15, respectively, also lying along the end 3 of scale unit 1.

The interconnecting conductors 14, 15 and 16 are located in the recess 18 of end 3. Recess 18 is typically a machine-out portion of base 7 which leaves the comparatively raised area 19. Base 7 is typically a magnetic metal such as steel.

Figure 2:
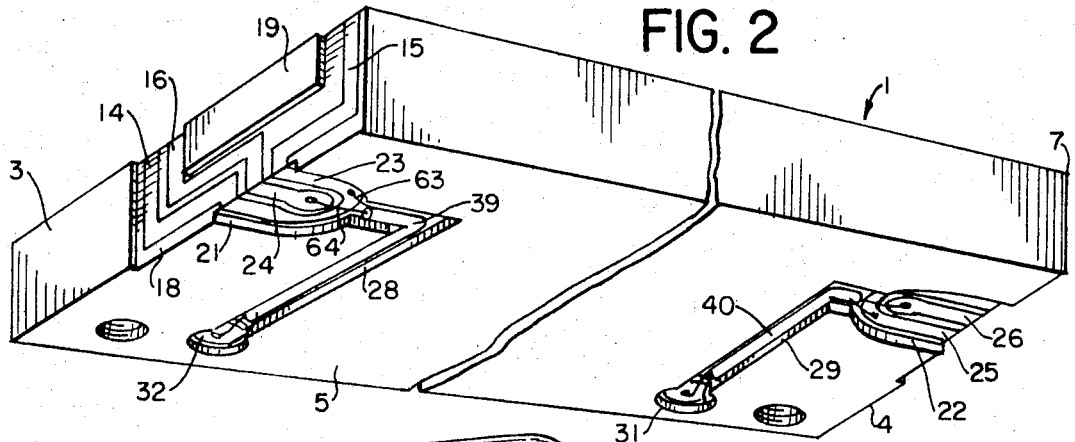
FIG. 2 depicts a bottom perspective view of the same scale unit of FIG. 1.

Referring to FIG. 2, a bottom perspective view of scale unit 1 is shown where the interconnecting conductors 14, 15 and 16 are again shown arrayed in the recess 18 of the end 3 of scale unit 1. The bottom surface 5 of the scale unit 1 includes a bottom recess 21 in which an interconnecting conductor 23 connects the interconnecting conductor 15 to the interconnecting conductor 14. Similarly, interconnecting conductor 16 is integrally connected to interconnecting conductor 24 which lies in the recess 21.

While the return conductors, end conductors and interconnecting conductors have, for convenience, been given separate reference numbers, they are typically all portions of the same integral conducting material. Typically, all the conductors of the present invention are formed using photographic and etching techniques on a copper sheet clad to an insulator.

The interconnecting conductors 23 and 24 are connected to the outer conductor 63 and inner conductor 64, respectively, of a coaxial cable 29 which runs along a channel or recess 28 in the bottom surface 5 to a coaxial connector 32. Similarly, conductors 25 and 26 connect to a coaxial cable 40 which runs along a channel or recess 29 at the opposite end of base 7 from a recess 22 to a coaxial connector 31. The coaxial connectors 31 and 32 extend from the bottom of base 7 through to the top surface 2 of base 7, the latter of which is shown in FIG. 1.

Figure 3:
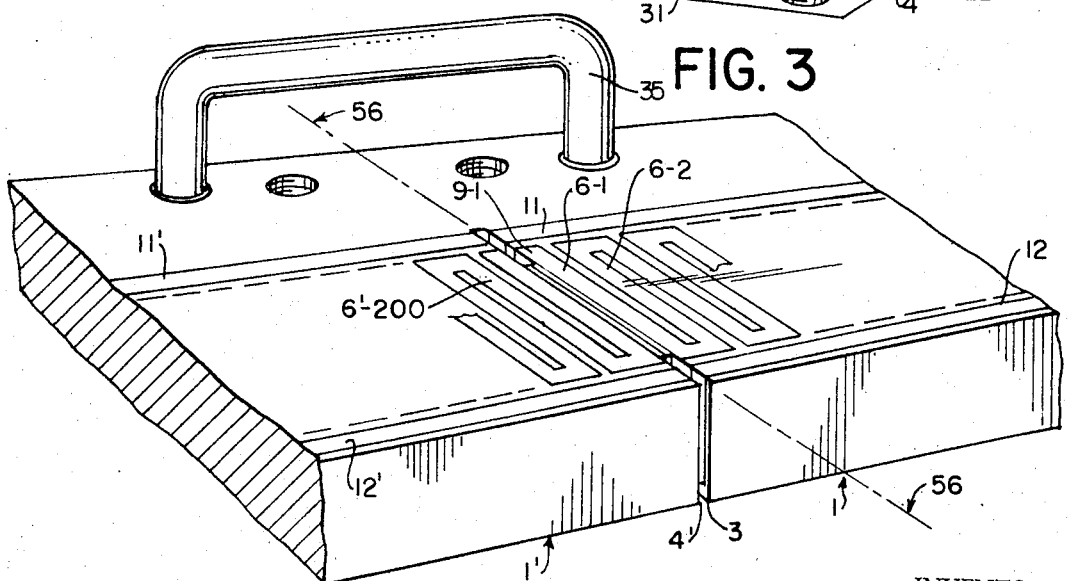
FIG. 3 depicts a perspective view of portions of two scale units of the FIG. 1 type abutting each other and forming a junction where they abut.

Referring to FIG. 3, a portion of the scale unit 1 of FIG. 1 is shown spatially abutting in an end-to-end fashion a second scale unit 1' like scale unit 1. The scale units 1 and 1' are electrically interconnected by a coaxial cable 35. The electrical interconnection and the end-to-end placement cooperate to cancel unwanted magnetic fields across the junction 56—56 between the scale units 1 and 1' as described further in connection with FIGS. 4 through 8 hereinafter. The end 3 of scale unit 1 abuts the end 4' of scale unit 1' where end 4' is identical to end 4 of the scale unit 1 of FIG. 1. The end 4' of scale unit 1' in FIG. 3 has interconnecting conductors which are the mirror image of the interconnecting conductors 14, 15 and 16 on end 3 of scale unit 1.

In FIG. 4, a portion of a scale unit 101, analogous to scale unit 1 of FIGS. 1 and 3 and another portion of a scale unit 101' analogous to a portion of scale unit 1' of FIG. 3 are shown at about twice actual size in end-to-end abutting relationship. The active conductors on scale unit 101 and scale unit 101' have prefixes 106- and 106'-, respectively. Active conductors 106-1 and 106-200 are spaced apart by the same amount as the other active conductors, for example, the spacing between the active conductors 106'-200 and 106'-199. The air gap between the scale units 101 and 101' along the junction 56-56 is generally between 0.005 and 0.010 inch which is small compared to the spacing between the active conductors 106-1 and 106'-200 which in one example is 0.1 inch.

Referring to FIG. 5, the array pattern of the interconnecting conductors on the end 104' and their connection to the conductors on the top surface of scale unit 101' as viewed in perspective along the axis 5'-5 of FIG. 4 is shown. Similarly, referring to FIG. 6, the array of conductors on the end 103 and their connection to the conductors on the top surface of scale unit 101 as viewed in perspective along the axis 6'-6 of FIG. 4 is shown. In FIG. 5, the interconnecting conductors 114', 115' and 116' are the mirror image of the interconnecting conductors 114, 115 and 116 of FIG. 6. Interconnecting conductors 114, 115 and 116 in FIG. 6 are analogous to interconnecting conductors 14, 15 and 16, respectively, of FIG. 1.

When the end 104' of FIG. 5 is abutted to the end 103 of FIG. 6, in the manner shown in FIG. 4, the interconnecting conductors 114', 115' and 116' on end 104' are juxtaposed and exactly opposite the interconnecting conductors 114, 115 and 116, respectively, of end 103. The interconnecting conductors on end 104' mate with the interconnecting conductors of end 103 and therefore, for the purpose of this invention, are defined to be substantially identically arrayed in space. In this mating arrangement, interconnecting conductor 114' and interconnecting conductor 114 form a pair. Similarly, interconnecting conductors 115' and 115 form a pair and interconnecting conductors 116' and 116 form a pair. The direction of current is shown for each conductor in those pairs by arrows where a single arrowhead represents a current of half the value of a double arrowhead. As can be seen by comparing FIGS. 5 and 6, and as will be further explained in connection with FIG. 7, each conductor in those pairs conducts with equal current in the opposite direction of the other conductor in the pair when the conductors in the pairs abut and are juxtaposed as in FIG. 4.

The identical spatial array of the interconnecting conductors on the ends 103 and 104', as shown in FIG. 5 and FIG. 6, coupled with the equal and opposite currents of each conductor in each pair achieves the cancellation of unwanted field coupling due to those interconnecting conductors. The interconnecting conductor 114 shown in FIG. 6 is connected to the return conductor 11 shown in both FIGS. 4 and 6. Similarly, the interconnecting conductor 115 is connected to the return conductor 112. The interconnecting conductor 116 is connected to the end conductor 109-1 which in turn connects to the active conductor 106-1.

In a similar manner, referring to FIG. 5, interconnecting conductors 114', 115' and 116' connect to return conductor 111', return conductor 112', and end conductor 109'-200, respectively. The interconnecting conductors 114', 114, 115' and 115 carry equal currents which are one-half the magnitude of the equal currents carried by interconnecting conductors 116' and 116.

Referring to FIG. 7, an electrical and spatial schematic of two scale units 201 and 201' are shown in end-to-end, abutting relationship. Each of the scale units 201 and 201' is analogous to the scale unit 1 of FIG. 1, analogous to the end-to-end placed scale units 1 and 1' of FIG. 3 and analogous to the end-to-end placed scale units 101 and 101' of FIGS. 4, 5 and 6. The active conductors for scale unit 201 are identified with the prefix 206- and, similarly, the active conductors for scale unit 201' are identified with the prefix 206'-. Scale unit 201 includes an array of parallel active conductors of which the active conductors 206-1 through 206-4 and 206-197 through 206-200 are shown. The active conductors 206- are connected in series along the top by the end conductors having a prefix 209-. For example, active conductors 206-2 and 206-3 are connected by the end conductor 209-2. Similarly, active conductors 206-3 and 206-4 are connected at the opposite end from end conductors 209- by the end conductor 208-1. The connecting conductors 208- and 209- are at 90 degrees with respect to the active conductors 206- and, hence, the end conductors are parallel to the direction of movement of the other member of the position-measuring transformer (not shown in FIG. 7).

In general, all of the elements identified with respect to scale unit 201 have a corresponding element numbered with a prime in scale unit 201'. These conductors arrayed in the plane of the active conductors 206- are shown solid in FIG. 7. Those conductors arrayed out of the plane of active conductors 206- are shown with broken lines.

The various conductors in FIG. 7 correspond to the conductors in FIGS. 4, 5 and 6, respectively, as follows: 201 to 101, 206- to 106-, 209- to 109-, 211 to 111, 212 to 112, 214 to 114, 215 to 115, and 216 to 116. An identical relationship exists between the primed numbers of FIG. 7 and the primed numbers of FIGS. 4, 5 and 6 for the above numbers in this paragraph. Additionally, the connection points 223 and 224 of FIG. 7 correspond, for example, to the connection point of inner conductor 64 to conductor 24 and the connection point of outer conductor 63 to conductor 23, respectively, in FIG. 2. Accordingly, the pair of conductors 256 in FIG. 7 corresponds to the coaxial cable 39 in FIG. 2. The coaxial cable 235 in FIG. 7 corresponds to the coaxial cable 35 in FIG. 3. While not specifically shown in the other views, the pair of conductors 256' correspond to a coaxial cable on the bottom side of scale unit 1 in FIG. 3. That bottom side in FIG. 3 is like the bottom side of the right-hand portion of scale unit 1 in FIG. 2. The terminals 223' and 224' would, therefore, be on connectors 26 and 25, respectively, if the right-hand side of scale unit 1 in FIG. 2 were the scale unit 1' in FIG. 3.

Between the adjacent active conductors 206-1 and 206'-200, lie the interconnecting conductors for electrically connecting the scale unit 201 winding section to the scale unit 201' winding section. The spacing between the active conductors 206'-200 and 206-1 is identical to the spacing between each of the other active conductors so that the fine pitch of, that is the spacing between, the active conductors is not varied while traversing the junction between the abutting ends of the scale units 201 and 201'. The interconnecting conductors between active conductors 206'-200 and 206-1 are substantially identically arrayed in space in pairs which conduct in opposite directions and which are out of the plane formed by the active conductors ,206'- and 206-. More specifically, the return conductors 211 and 211' conduct in the same direction in the plane of active conductors 206- and 206'-. At the junction 56 between scale units 201 and 201', however, interconnecting conductors 214 and 214', connected to return conductors 211 and 211', respectively, form a pair and are substantially identically arrayed in space in the manner explained with reference to FIGS. 4, 5 and 6. With the connections shown in FIG. 7, the pair of interconnecting conductors 214 and 214' conduct in opposite directions with equal currents. Interconnecting conductors 216 and 216' also form a pair and they are connected to the end conductors 209-1 and 209'-200, respectively, which in turn are connected to active conductors 206-1 and 206'-200, respectively. Interconnecting conductors 216 and 216' are substantially identically arrayed in space in the manner explained with reference to FIGS. 4, 5 and 6 and are wired to conduct in opposite directions with equal current. The interconnecting conductors 215 and 215' form a pair and are connected to the return conductors 212 and 212', respectively. Interconnecting conductors 215 and 215' are substantially identically arrayed in space and are wired to conduct in opposite directions with equal current. The interconnecting conductors 214 and 215 meet at a connection point 223 and similarly the opposite conducting conductors of the pair, namely, conductors 215' and 224' meet at connection point 223'. The pair of conductors 216 and 216' run to connection points 224 and 224', respectively. From the points 223 and 224, a pair of conductors, which may be a coaxial cable as described in connection with FIG. 3, connect to the terminal points 253 and 254, respectively. Similarly, from the connection points 223' and 224' a pair of conductors 256' lead to the terminals 263' and 264', respectively. The terminals 253 and 254 are connected by a coaxial cable 235 to the terminals 263' and 264', respectively.

By way of summary, all of the interconnecting conductors for interconnecting the conductors of scale unit 201 to the conductors of scale unit 201' are substantially identically arrayed in space in pairs which conduct in the opposite direction with equal currents for each pair of conductors. The equal current condition can be understood by referring to signal source 270 which applies a signal across the terminals 263 and 264 of scale unit 201. The coaxial cable or other wire pair 257 connects to the interconnecting conductors 314, 315 and 316 which in turn connect respectively to the return conductors 211 and 212 and to the active conductor 206-200 via the end conductor 209-200. The return conductors 211 and 212 conduct one-half the current in the active conductors 206- due to the split between conductors 314 and 315 at connection point 320. The half-current values are indicated in FIG. 7 by the presence of a single arrowhead, for example, arrowhead 326 for interconnecting conductor 315, whereas the full current level is indicated by a double arrowhead, for example, double arrowhead 327 for active conductor 206-200. Similarly, the interconnecting conductor 216 carries the full current of the active conductors and the interconnecting conductor 214 carries the half-current level of the return conductors. As is evident from FIG. 7, the full current interconnecting conductor 216 of scale unit 201 is paired with the equal but opposite full current conductor 216' of scale unit 201'. Similarly, the half-current interconnecting conductors 214 and 214' are paired so that the desired field coupling cancellation results. Note also that the equal but opposite conductors 215 and 215' are half-current conductors.

In the FIG. 7 device, only two scale units 201 and 201' are shown with a junction 56. The terminals 253' and 254' are connected in common by a jumper 251. In usual operation, however, many scale units of the 201, 201' type are connected in the end-to-end fashion of FIG. 7, and hence, many more junctions like junction 56 are usually present. For example, an additional junction would be formed at the location of interconnecting conductors 314', 315' and 316' by adding another scale unit like scale unit 201 to the left of scale unit 201'. The jumper between terminals 253' and 254' would be removed and placed on the newly added scale unit and an additional coaxial cable, like cable 235, would be added so that a new junction identical to junction 56 would be added. Of course, any number of additional scale units may be added in this fashion.

Referring to FIG. 8, a schematic representation of the fine pitch resultant field pattern for the interconnected scale units of FIG. 7 is shown. The junction 56 between the scale units 201 and 201' of FIG. 7 is represented by the line 56' in FIG. 8.

The field lines in FIG. 8 have prefixes 306- and 306'- which correspond to the active conductors having the prefixes 206- and 206'- of FIG. 7. The field pattern of FIG. 8 alternates in direction with a uniform pitch, that is, the field lines have equal spacing. The field pattern in FIG. 8 is basically transverse to the direction of measurement as defined by the active field lines 306- and 306'-. The end field lines along both ends of the active field lines, however, are parallel to the direction of travel and are indicated with the prefixes 310-, 310'-, 311- and 311'- which are derived from a combination of the fields from return conductors 211, 211', 212 and 212' and end conductors 208-, 208'-, 209-, and 209'- in FIG. 7. For example, the field line 310-1 is between the active field lines 306-1 and 306-2 on one end; and the field line 311-1 is between the same active field lines on the other end. Note that the end field lines 310- and 311- are each of half the strength of the active field lines. The half strength is shown by single arrowheads, and the full strength is shown by double arrowheads. The half field strengths in the end field lines between active field lines 306-1 and 306-2 result in the following manner from the FIG. 7 pattern.

Active conductors 206-1 and 206-2 are each of full strength, shown by the double arrows in FIG. 7, and give rise, therefore, to the full-strength field lines 306-1 and 306-2 of FIG. 8. The end field line 310-1 of FIG. 8 results from the half field of the half-current return conductor 211 of FIG. 7. Since there is no other conductor across the space between active conductors 206-1 and 206-2 of FIG. 7, the end field line 310-1 is one-half strength, the same as return conductor 211. The end field line 311-1 is the half-strength resultant of the full-strength field from conductor 208-1 and the half-strength field of the return conductor 212. In a similar manner, each of the other resultant end field lines shown in FIG. 8 if of half strength. Also, adjacent end field lines in FIG. 8 alternate in direction. For example, field lines 310-1 and 310-2 are opposite in direction as are field lines 310-2 and 310-3.

Of particular interest, is the resultant field surrounding the junction 56' in FIG. 8. As previously indicated in connection with the discussion of FIG. 7, all of the interconnecting conductors between scale units 201 and 201' are out of the plane of the active conductors 206- and form equal and opposite conducting pairs substantially identically arrayed in space. This array or pattern of interconnecting conductors neutralizes any unwanted coupling by the interconnecting conductors. The resultant field pattern across the junction 56 in FIG. 7 is therefore substantially identical to the resultant field pattern between other active conductors in FIG. 7 array. Accordingly, in FIG. 8, the field lines 310-0 and 311-0 are equal and opposite to the adjacent field lines 310-1 and 311-1, respectively, and 310'-200 and 311'-200, respectively.

More particularly, the field line 310-0 is the resultant formed by the fields from end conductors 209-1 and and 209'-200 both conducting in the same direction with full current, when opposed by the half-strength fields caused by half-current return conductors 211 and 211' conducting in the opposite direction. Similarly, the field line 311-0 is the resultant of the field created by the unopposed half-current return conductors 212 and 212' between active conductors 206'-200 and 206-1 of FIG. 7.

Figure 9:
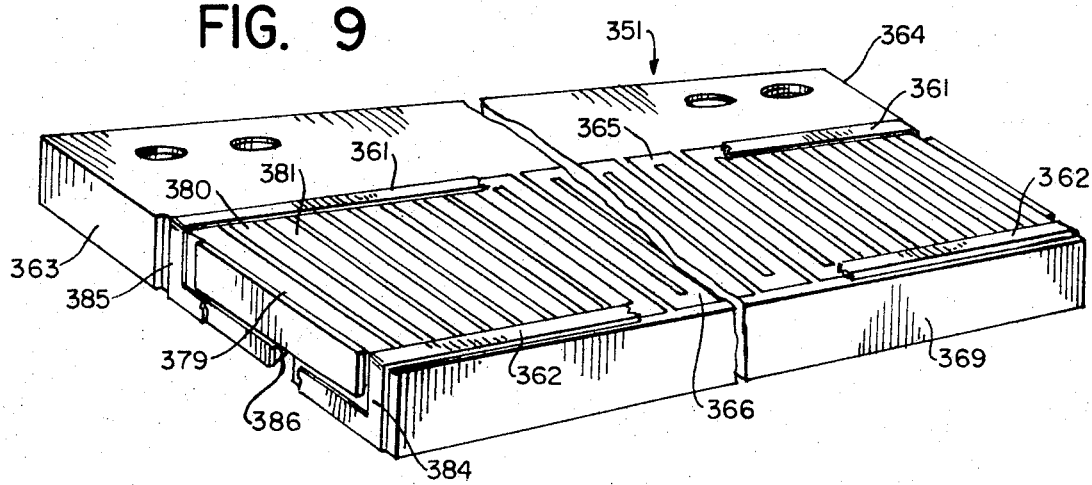
FIG. 9 depicts a top perspective view of a scale unit in accordance with another embodiment of the present invention.

Referring to FIG. 9, an alternate embodiment of a scale unit 351 similar to that of scale unit 1 of FIG. 1 is shown. Scale unit 351 in FIG. 9 is a multi-layer device in which the return conductors 361 and 362 are overlaid the end conductors, of which end conductors 365 and 366 are typical. The end conductors and the return conductors are integrally connected to the interconnecting conductors on the end 363 of the scale unit 351.

Figure 10:
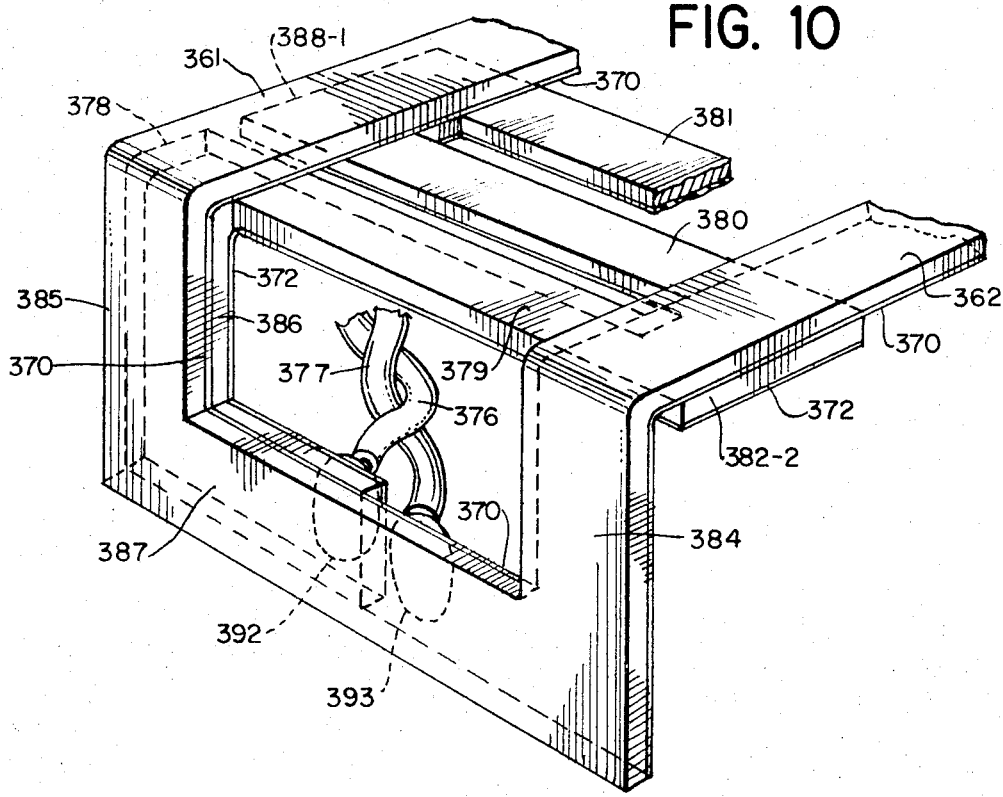
FIG. 10 depicts an enlarged representation of the conductors along the top surface and end of the scale unit of FIG. 9.

In FIG. 10, the end portion of scale unit 351 is shown without the supporting base 369 shown in FIG. 9. The active conductors 379, 380 and 381 are separated from the return conductors 361 and 362 by the insulating layer 370. In FIG. 9, end 364, opposite from the end 363, has an array or pattern of interconnecting conductors which is identical to, that is, the mirror image of the interconnecting conductors on the end 363. In this manner, when two of the devices of the FIG. 9 type are placed adjacent, end to end, the interconnecting conductors in the junction between the abutting scale units are substantially identically arrayed and are connected to conduct in opposite directions in a manner analogous to that previously described in connection with FIGS. 4, 5 and 6. The interconnecting conductor 385 is connected to the return conductor 361 and they are both separated from the conductors they overlay, for example, interconnecting conductor 386 and end conductor 382, by the same insulating layer 370. Similarly, the interconnecting conductor 384 is connected to return conductor 362 at right angles to the return conductor 362. The interconnecting conductors 384 and 385 are connected in common by the bottom portion 387 which is also separated from the conductor 386 by the insulating layer 370. Twisted leads 376 and 377 connect to the conductor 386 and the conductor portion 387, respectively, at solder connection points 392 and 393, respectively. These twisted leads 376 and 377, or alternatively a coaxial cable, are connected along the back side of base 369 in a slot or recess 355 provided therefor as shown in FIG. 11.

In FIG. 11, an exploded assembly view of the FIG. 9 scale unit is shown. The base 369 includes one end 363 and an opposite end 364. The ends 363 and 364 are designed with terminal patterns or arrays of interconnecting conductors which mate with the corresponding terminal patterns of arrays of end-to-end placed scale units of identical manufacture. A recess 358 is provided in the end 363 of base 369. A slot 355 appears in the bottom 356 of base 369 and slot 355 runs from the bottom area of recess 358 to a hole 359. In a similar manner, the end 364 includes a recess 358', a slot 355' which connects recess 358' to a hole 359'.

The base 369 is typically magnetic material but may be any rigid material such as glass. The use of a metal base in transducers like those of the present invention is described in U.S. Pat. No. 3,202,948 to C. L. Farrand and assigned to the same assignee as the present invention.

The holes 359 and 359' in base 369 receive the coaxial connectors 353 and 353'. Connector 356 is connected to twisted conductors 376 and 377 and connector 353' is connected to a similar twisted pair, not shown. Connectors 353 and 353' are mounted in base 369 by frictional contact, cement, or other conventional technique. The active conductors, including active conductors 379, 380 and 381, are interconnected on the insulating layer 372 by the end conductors, for example, end conductors 378, 388-1, 388-2 and 388-3. Integrally connected to the end conductors 378 is the interconnecting conductor 386 which is at right angles to the plane of the active conductors. While the interconnecting conductors, the end conductors and the active conductors have been given different names for convenience in describing their electrical function, it is the usual condition that all of those conductors are formed from one continuous flat sheet of conducting material as previously described. The active conductors, the end conductors, and the interconnecting conductors are placed on top surface 354 of base 369 so that the interconnecting conductor 386 fits into the recess 358 in the end 363. In a similar manner, the interconnecting conductor 386', at right angles to the plane of the active conductors, fits into the recess 358' of the end 364 in base 369.

The top layer is formed by the return conductors 361 and 362 where the interconnecting conductors 384, 384', 385 and 385' are at right angles to the plane of return conductors 361 and 362. The interconnecting conductors 385 and 385' lie superposed over the vertical portion of interconnecting conductors 386 and 386', respectively. The return conductor 361 is superposed over the end conductors on the top side of scale unit 351, for example, over end conductors 378, 382-1 and 382-3. Return conductor 362 is superposed over the end conductors on the opposite side of scale unit 351, for example, over end conductors 382-2 and 382-4. The slots 355 and 355' receive twisted wires, like twisted wires 376 and 377, with soldered connections at one end to the coaxial connectors 353 and 353' and at the other end to the interconnecting conductors 385 and 386 and their respective primed counterparts. The connections are made in order to obtain the direction of current described previously in connection with FIG. 7, FIG. 7 also being descriptive of two interconnected scale units of the FIG. 9 type.

In FIG. 12, the solid lines depict a schematic representation of a scale winding 375 which forms one member of a position-measuring transformer. Scale winding 375 has a junction 345, like junction 56 in FIG. 7, but the interconnecting conductors at junction 345 have not been shown. The sine and cosine windings 394 and 395 of the other member, called a slider, of a positioning-measuring transformer are shown schematically by broken lines. The scale winding 375 includes active conductors of which active conductors 289-1, 389-2 and 389-9 are typical. Also shown are the return conductors 390 and 391 and end conductors having a prefix 388-, for example, 388-1 and 388-2.

The active conductors of FIG. 12 have a periodic pitch p. The slider sine winding 394 and cosine winding 395 are in space quadrature of the scale unit cycle, where that cycle is equal to twice the pitch of the active conductors on scale winding 375. The sine winding 394 includes the winding section between terminals S1 and S2 which is connected in series to the winding section between terminals S3 and S4 by a jumper 332 between terminals S1 and S3. Similarly, the cosine winding 395 includes the winding section between terminals C1 – C2 which is connected in series with the winding section between terminals C3 – C4 by a jumper 333 between terminals C3 and C1.

The end conductors 397 and 398 between the active conductors 399-1 and 399-2 and 399-3 and 399-4, respectively, for the cosine winding 395 are substantially equal in length to the end conductors 382- between the active conductors of the scale winding 375. With this substantial equality in length, the magnetic field coupling between the end conductors of the sine and cosine windings 394 and 395 and the end conductors 388 of the scale winding 375 varies in the same manner as the coupling between the active conductors 389- of the scale winding 375 and the active conductors 399- of the sine and cosine windings 394 and 395.

With this coupling of the end conductors varying in the same manner as the coupling of the active conductors, that is, in phase with the fundamental and with bias, the end conductors contribute a component in the transformer operation which adds to the fine pattern or fundamental coupling. If the end conductors of one winding member, for example, on scale winding 375 in FIG. 12, are unequal to the end conductors, for example on sine and cosine windings 394 and 395, then the coupling produced by the end conductors is not similar to the fine pattern coupling produced by the active conductors. When the coupling is not similar, a deleterious effect may be produced in the fine field pattern coupling. The deleterious effect is gradual and, therefore, exact equality in the end conductor lengths is not necessary and is sometimes not preferred. For example, the cancellation of harmonic errors is frequently achieved by shortening the end conductor lengths of the scale winding as discussed in U.S. Pat. No. 2,799,835, to R. W. Tripp, et al. and assigned to the same assignee as the present invention.

In FIG. 13, a perspective view of a scale winding member 400 and a sine and cosine winding member 410 are shown. The scale winding 375 on member 400 is separated from the sine and cosine windings 394 and 395 on member 410 by an air gap. The scale winding member 400 includes two scale units 401 and 402 having a junction 345 therebetween. The scale units 401 and 402 are typically bolted in a machine base or other rigid, flat surface (not shown in FIG. 13).

In connection with FIG. 12, as more specifically discussed in connection with FIGS. 7 and 8, the field pattern across the junction 345 presents the same uniform fine field coupling between the scale winding 375 and the sine and cosine windings 394 and 395 as occurs in areas remote from junction 345.

Further, there are no gross fields to which the sine and cosine windings can couple. The gross fields, or one-turn loop coupling field, are cancelled out or neutralized and only the fine field pattern exists for the reasons previously discussed in connection with FIGS. 7 and 8. Referring specifically to FIG. 12, the end conductor 388-6 for the sine winding section between terminals S1 and S2 when translated past the end conductors for the scale winding 375 couples with resultant end fields which alternate in direction for each half cycle, p, of scale winding 375. The alteration in field direction corresponds to the alternating direction of the field lines 310- in FIG. 8. This alteration in field line direction is in phase with the fundamental component of coupling between the active conductors. Each of the other winding sections for the sine and cosine windings of FIG. 12 have end conductors, namely end conductors 388-4, 388-7 and 388-9, which couple in phase with and unbiased to the fundamental signal in the same manner as end conductor 388-6.

Position-measuring transformers of a general type described in this specification are frequently marketed under the registered trademark INDUCTOSYN.

I claim:

1. A position-measuring transformer member comprising a plurality of winding for end-to-end placement to form a continuous winding, wherein each winding section includes active conductors connected in series and wherein each active conductor conducts in a direction opposite to the direction of conduction of each adjacent active conductor, characterized by terminal conductors at each end of each winding section, said terminal conductors consisting of a pair of conductors carrying current in opposite directions and terminating in a socket member and a coaxial cable member fitting the socket members of adjoining sections to connect one winding section in series with an adjoining section without producing an unwanted loop field.

2. Transformer member according to claim 1, each winding section having a winding having end conductors connecting parallel active conductors of the winding in series, each winding section having a base, return conductors arranged at opposite sides of the winding of each section parallel to said end conductors, each end of the base of each section having three terminal connections whereof two terminal connections are for said return conductors and are arranged at opposite sides of a terminal connection for an end conductor of the winding.

3. Transformer member according to claim 2, said terminal connections at one end of each base having a shape and location, the same as the shape and location of the terminal connections at the opposite end of each base whereby, when two of said bases are placed end-to-end, the terminal connections at the adjoining ends of said bases coincide and carry current in opposite directions.

4. Transformer member according to claim 3, the winding of each section having its active conductors arranged in a plane, the said terminal connections at both ends of the base being arranged in other planes at right angles to the first-mentioned plane, said terminal connections at each end of the base being arranged in a recess in the end of the base.

5. A position-measuring transformer having relatively movable, inductively coupled members, one of said members including a plurality of scale sections placed end-to-end and interconnected to form a continuous scale winding, wherein each scale section includes a base of magnetic material having a winding section having active conductors arrayed with a fine pitch and extending transversely to the direction of relative movement of said members and connected in series by end conductors parallel to the direction of relative movement of said members, and wherein each active conductor conducts in a direction opposite to the direction of conduction of each adjacent conductor, said winding having return conductors and terminal connections for said winding section and for said return conductors; characterized in this that said terminal connections at one end of said base have a shape and location, the same as the shape and location of the terminal connections at the opposite end of said base whereby, when two of said bases are placed end-to-end, the terminal connections at the adjoining ends of said bases coincide and carry current in opposite directions, said terminal connections at each end of the base having extensions arranged in a recess in the base, said extensions being arranged in pairs and carrying current in opposite directions, coaxial connectors for said extensions between the bottom and the top of the base and a coaxial cable for interconnecting adjacent scale sections to extend the scale winding from one scale section to the other scale section.

* * * * *